US008390437B2

(12) United States Patent
Sherman

(10) Patent No.: US 8,390,437 B2
(45) Date of Patent: Mar. 5, 2013

(54) ULTRASONIC VIBRATOR

(75) Inventor: Itay Sherman, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 1010 days.

(21) Appl. No.: 12/413,609

(22) Filed: Mar. 30, 2009

(65) Prior Publication Data

US 2009/0267749 A1 Oct. 29, 2009

Related U.S. Application Data

(60) Provisional application No. 61/125,441, filed on Apr. 25, 2008.

(51) Int. Cl.
*H04B 3/36* (2006.01)

(52) U.S. Cl. ................ 340/407.1; 455/550.1; 455/575.1

(58) Field of Classification Search ............... 340/407.1; 455/550.1, 567, 575.1, 575.8
See application file for complete search history.

(56) References Cited

U.S. PATENT DOCUMENTS

| | | | | |
|---|---|---|---|---|
| 5,894,263 | A * | 4/1999 | Shimakawa et al. | 340/407.1 |
| 6,211,775 | B1 * | 4/2001 | Lee et al. | 340/407.1 |
| 6,738,489 | B2 * | 5/2004 | Chung et al. | 340/407.1 |
| 7,023,326 | B2 * | 4/2006 | Hwang | 340/384.71 |
| 7,110,564 | B2 * | 9/2006 | Son | 340/407.1 |
| 7,129,824 | B2 * | 10/2006 | Cranfill et al. | 340/407.1 |
| 7,194,287 | B2 * | 3/2007 | Usuki et al. | 340/388.4 |
| 7,245,891 | B2 * | 7/2007 | Hugunin | 455/148 |
| 7,936,251 | B1 * | 5/2011 | Hamaguchi et al. | 340/7.6 |
| 2005/0085275 | A1 * | 4/2005 | Hugunin | 455/567 |
| 2007/0178942 | A1 * | 8/2007 | Sadler et al. | 340/407.1 |

* cited by examiner

*Primary Examiner* — Eric M Blount
(74) *Attorney, Agent, or Firm* — Soquel Group LLC

(57) ABSTRACT

A mobile device including a casing, a signal generator housed within the casing, for generating signals, at least one speaker housed within the casing and coupled with the signal generator, for producing sound from a signal generated by said signal generator, wherein the sound produced by the at least one speaker is (i) substantially inaudible, and (ii) vibrates the casing at a frequency approximately equal to a resonant frequency of the casing.

9 Claims, 2 Drawing Sheets

100

ULTRASONIC VIBRATOR

PRIORITY REFERENCE TO RELATED APPLICATIONS

This application claims benefit of U.S. Provisional Application No. 61/125,441, entitled ULTRASONIC VIBRATOR, filed on Apr. 25, 2008 by inventor Itay Sherman.

FIELD OF THE INVENTION

The field of the present invention is vibrators for mobile electronic devices.

BACKGROUND OF THE INVENTION

Many modern mobile electronic devices include speakers that generate audible outputs, and vibrators that are enabled when the audible outputs are not desired. A vibrator provides indications of activity, such as incoming calls or alarms, by vibrating a mobile device. Most common vibrators use motors with unbalanced weight on the motors' rotating part. The vibrator produces vibrations at low frequencies, which are sub-audible.

SUMMARY OF THE DESCRIPTION

Aspects of the present invention relate to mobile device speakers that generate inaudible vibrations.

There is thus provided in accordance with an embodiment of the present invention a mobile electronic device including a casing, a signal generator housed within the casing, for generating signals, at least one speaker housed within the casing and coupled with the signal generator, for producing sound from a signal generated by said signal generator, wherein the sound produced by the at least one speaker is (i) substantially inaudible, and (ii) vibrates the casing at a frequency approximately equal to a resonant frequency of the casing.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to mobile device speakers that generate inaudible vibrations.

Figure 1:
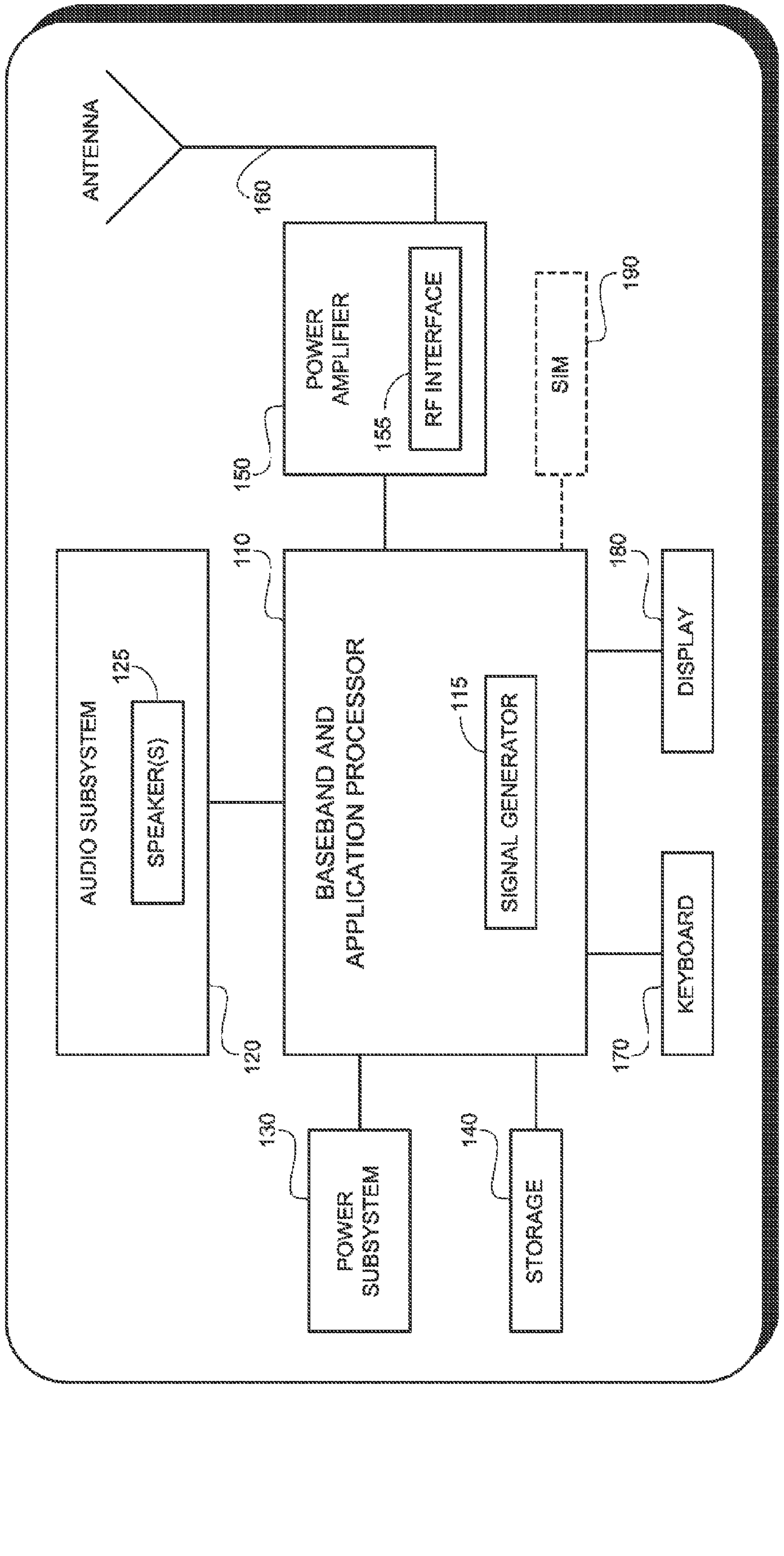
FIG. 1 is a simplified block diagram of a mobile device with speakers that generate sound signals that produce inaudible vibrations of the mobile device, in accordance with an embodiment of the present invention.

Reference is now made to FIG. 1, which is a simplified block diagram of a mobile device 100 with speakers that generate sound signals that produce inaudible vibrations of the mobile device, in accordance with an embodiment of the present invention. As shown in FIG. 1, mobile device 100 includes six primary components; namely, a baseband and application processor 110, an audio subsystem 120, a power subsystem 130, a data storage 140, a power amplifier 150 and an antenna 160. Baseband and application processor 110 includes a signal generator 115. Audio subsystem 120 includes one or more speakers 125. In accordance with an embodiment of the present invention, speakers 125 receive input digital signals from signal generator 115, and generate output analog audio. Power amplifier 150 includes a radio frequency (RF) interface 155.

Mobile device 100 also includes a keyboard 170 for input, a display 180 for output, and an optional subscriber identification module (SIM) 190.

Figure 2:
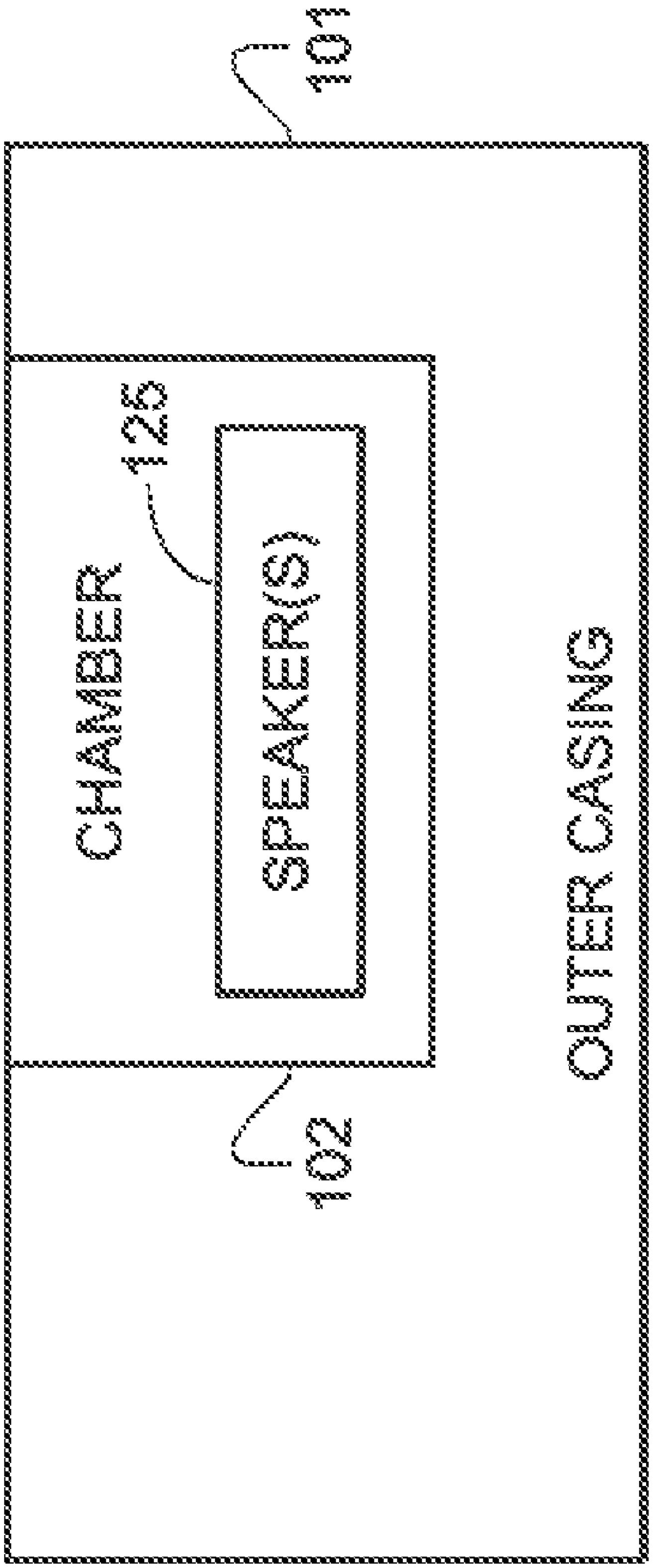
FIG. 2 is a simplified diagram of the speakers of FIG. 1 positioned within a casing of the mobile device, in accordance with an embodiment of the present invention.

Vibrations of mobile device 100 are sensed through the device's body and casing. In this regard, reference is now made to FIG. 2, which is a simplified diagram of speakers 125 positioned within an outer casing 101 of mobile device 100, in accordance with an embodiment of the present invention. As shown in FIG. 2, speakers 125 are positioned within a chamber 102 adjacent to outer casing 101.

Outer casing 101 generally has a limited frequency response, limited to low frequencies. The frequency response of outer casing 101 generally has one or more resonant frequencies. In addition, the frequency response of outer casing 101 is generally non-linear, and its response to a vibration stimulus within its band pass may be modeled as $f(x)=ax+bx+cx^3+\ldots$, where x denotes a stimulus, and f(x) denotes the vibration result.

Due to size constraints of mobile devices, the frequency response of prior art speakers is generally limited to low frequencies, and the sound pressure that the speakers generate below 100 Hz is limited.

In accordance with an embodiment of the present invention, signal generator 115 generates a composite sound signal as a mix of two high frequency harmonics. The composite signal is input to speakers 125, which in turn cause mobile device 100 to vibrate at low frequencies near the resonant frequency of outer casing 101. The sound signal generated by signal generator 115 is represented as $$S(t)=\sin(2\pi f_h t)+\sin(2\pi(f_h+f_r)t) \quad (1)$$

where $f_r$ is approximately equal to the resonant frequency of outer casing 101, and the frequencies $f_h$ and $f_h+f_r$ are high enough to be above the human audio range and yet within the response range of speakers 125. Generally, selecting $f_h$ within the range of 20-30 KHz satisfies this requirement.

Due to the non-linearity of the frequency response of outer casing 101, the vibrations generated by the signal S(t) of EQ. 1 include mixed harmonics corresponding to sums and differences of the frequencies $f_h$ and $f_h+f_r$. Since the frequency response of outer casing 101 is low pass, all combinations of $f_h$ and $f_h+f_r$ are dampened, except for the difference frequency $f_r$, which is passed and which generates significant vibrations of outer casing 101 due to resonance.

According to an embodiment of the present invention, if the resonant frequency of outer casing 101 is unknown, signal generator 115 varies the frequency $f_r$ gradually over time so as to sweep through the relevant resonant frequency range. For example, if the resonant frequency of outer casing 101 is estimated to be in the range of 20-50 Hz, signal generator 115 varies frequency $f_r$ over 20-50 Hz; say, $$f_r=f_m+A\sin(2\pi f_s t) \quad (2)$$

where $f_m$ is the middle frequency, $f_m$=35 Hz, A is half of the sweep range, A=15 Hz, and $f_5$ is a sweep increment that is significantly below the resonant frequency, say between 1-2 Hz.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A mobile electronic device comprising:

a casing;

a signal generator housed within said casing, for generating a signal that is a composite of at least two harmonics, each of which has a frequency higher than the human audible range, wherein the difference in frequencies for two of the at least two harmonics is approximately equal to the resonant frequency of said casing;

at least one speaker housed within said casing and coupled with said signal generator, for producing sound from a signal generated by said signal generator, wherein the sound produced by said at least one speaker is (i) substantially inaudible, and (ii) vibrates said casing at a frequency approximately equal to a resonant frequency of said casing.

2. The mobile electronic device of claim 1 wherein the at least two harmonics each has a frequency in the range of 20-30 KHz.

3. The mobile electronic device of claim 1 wherein the difference in frequencies for two of the at least two harmonics is in the range of 20-50 Hz.

4. The mobile electronic device of claim 1, wherein the device does not comprise a rotating motor.

5. The mobile electronic device of claim 1 wherein the signal generated by said signal generator is of the form $$S(t)=\sin(2\pi f_h t)+\sin(2\pi(f_h+f_r)t),$$

where the frequencies $f_h$ and $f_h+f_r$ are above the human audible range and within the response range of said at least one speaker.

6. The mobile electronic device of claim 5 wherein the frequency $f_r$ is of the form $$f_r=f_m+A\sin(2\pi f_s t),$$

where $f_m$ is a middle frequency, A is a half-range amplitude, and $f_s$ is a sweep increment that is significantly below the resonant frequency of said casing.

7. The mobile electronic device of claim 6 wherein the resonant frequency of said casing is within the range $f_m-A$ to $f_m+A$.

8. The mobile electronic device of claim 1 further comprising a baseband processor that comprises said signal generator.

9. The mobile electronic device of claim 8 further comprising a power subsystem coupled with said baseband processor.

* * * * *